United States Patent
Tyou et al.

(10) Patent No.: US 11,489,832 B2
(45) Date of Patent: Nov. 1, 2022

(54) COMMUNICATION CONTROL APPARATUS, COMMUNICATION CONTROL METHOD, AND COMMUNICATION CONTROL PROGRAM

(71) Applicant: NIPPON TELEGRAPH AND TELEPHONE CORPORATION, Tokyo (JP)

(72) Inventors: Iifan Tyou, Musashino (JP); Masaki Tanikawa, Musashino (JP); Yukio Nagafuchi, Musashino (JP); Shingo Kashima, Musashino (JP); Tetsuhiko Murata, Musashino (JP); Kenji Ota, Musashino (JP); Takuya Saeki, Musashino (JP); Tsuyoshi Kondo, Musashino (JP); Koki Nomura, Musashino (JP); Akio Mukaiyama, Musashino (JP); Hiroki Nagayama, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 204 days.

(21) Appl. No.: 16/976,770

(22) PCT Filed: Mar. 1, 2019

(86) PCT No.: PCT/JP2019/008251
§ 371 (c)(1),
(2) Date: Aug. 31, 2020

(87) PCT Pub. No.: WO2019/168192
PCT Pub. Date: Sep. 6, 2019

(65) Prior Publication Data
US 2021/0014225 A1  Jan. 14, 2021

(30) Foreign Application Priority Data
Mar. 1, 2018  (JP) .............................. JP2018-036985

(51) Int. Cl.
*H04W 48/02* (2009.01)
*H04W 88/02* (2009.01)
(Continued)

(52) U.S. Cl.
CPC .......... *H04L 63/0876* (2013.01); *H04L 12/66* (2013.01)

(58) Field of Classification Search
CPC ........................... H04L 63/0876; H04L 12/66
See application file for complete search history.

(56) References Cited

U.S. PATENT DOCUMENTS

2016/0173495 A1\* 6/2016 Joo .................. H04L 63/1425
  713/171
2017/0054745 A1\* 2/2017 Zhang ............... H04L 63/1425
(Continued)

FOREIGN PATENT DOCUMENTS

JP  2004-140606 A  5/2004
JP  2005-159646 A  6/2005
(Continued)

OTHER PUBLICATIONS

An Automata Based Intrusion Detection Method for Internet of Things. Fu. Hindawi. (Year: 2017).\*
(Continued)

*Primary Examiner* — Venkat Perungavoor
(74) *Attorney, Agent, or Firm* — Xsensus LLP

(57) ABSTRACT

A communication control apparatus includes a collection control unit, an analysis unit, and a coordination unit. The collection control unit collects communication performed with a device connected to a subordinate network, and
(Continued)

controls communication performed by the device based on a first control condition; The analysis unit analyzes the communication collected by the collection control unit to extract device identification information indicating characteristics of the communication performed by the device. The analysis unit specifies a device name of the device and the first control condition corresponding to a normal communication range extracted from the device identification information, based on the device identification information. The coordination unit transmits at least part of first shared information in which the device name and the first control condition specified by the analysis unit and the device identification information are associated with each other, to an outside of the subordinate network.

12 Claims, 15 Drawing Sheets

(51) Int. Cl.
*H04L 9/40* (2022.01)
*H04L 12/66* (2006.01)
*G06F 21/45* (2013.01)

(56) References Cited

U.S. PATENT DOCUMENTS

2017/0168885 A1* 6/2017 Jain ............... G06F 11/3684
2017/0237603 A1* 8/2017 Imai ............... H04L 49/555
370/219

FOREIGN PATENT DOCUMENTS

JP 2014-063424 A 4/2014
WO 2016/027447 A1 2/2016

OTHER PUBLICATIONS

Whitelists Based Multiple Filtering Techniques in SCADA Sensor Networks. Kang. Hindawi. (Year: 2014).*
KR10751760. English Translation. (Year: 2017).*
KR102119374. English Translation. (Year: 2020).*
An Anomaly Behavior based Detection and Prevention of DoS Attack in IoT Environment. Kumar. IEEE. (Year: 2017).*
IoTGuard: Scalable and Agile Safeguards for Internet of Things. Park. IEEE. (Year: 2016).*
Feature Engineering for Cyber-attack detection in Internet of Things. Dissanayake. MECS.(Year: 2021).*
Detecting Behavioral Change of IoT Devices Using Clustering-Based Network Traffic Modeling. Sicanathan. IEEE.(Year: 2020).*
International Search Report and Written Opinion dated May 14, 2019 for PCT/JP2019/008251 filed on Mar. 1, 2019, 11 pages including English Translation of the International Search Report.
Notification of Reasons for Refusal received for Japanese Patent Application No. 2018-036985, dated Jun. 9, 2020, 12 pages including English Translation.
Ide, T., "Introduction to Anomaly Detection using Machine Learning," Corona Publishing Co., Ltd., Feb. 19, 2015, pp. 124-139.
Kondoh, T., et al., "A Study of Requirements on Authentication and Traffic Control for IoT Devices," The Institute of Electronics, Information and Communication Engineers, IEICE Technical Report, vol. 116, No. 251, Oct. 20, 2016, pp. 15-18 (with English Translation).
Tyou, I. et al., "A study of decentralized IoT Security Controller," IEICE Technical Report, vol. 117, No. 481, Feb. 28, 2018, pp. 43-48 (see English Abstract).

* cited by examiner

COMMUNICATION CONTROL APPARATUS, COMMUNICATION CONTROL METHOD, AND COMMUNICATION CONTROL PROGRAM

CROSS-REFERENCE TO RELATED APPLICATIONS

The present application is based on PCT filing PCT/JP2019/008251, filed Mar. 1, 2019, which claims priority to JP 2018-036985, filed Mar. 1, 2018, the entire contents of each are incorporated herein by reference.

TECHNICAL FIELD

The present invention relates to a communication control apparatus, a communication control method, and a communication control program.

BACKGROUND ART

Due to the arrival of the IoT (Internet of Things) era, various devices (IoT devices) have become connected to the Internet and used in various ways. Accordingly, security measures for IoT devices, such as a traffic session anomaly detection system and an intrusion detection system (IDS) for IoT devices, are expected to be realized.

For example, traffic control at a gateway, which serves as a connection point to the Internet, has been proposed in consideration of the high risk of consumer IoT devices becoming infected with malware (NPL 2).

Also, a method for defining a normal subspace based on a feature, and defining, for example, a distance from the normal subspace as an anomaly level to detect an anomaly from data, is known (NPL 1).

CITATION LIST

Non Patent Literature

[NPL 1] Tsuyoshi IDE, "Nyumon Kikai gakushu ni yoru ijyo kenchi—R ni yoru jissen gaido", CORONA PUBLISHING CO., LTD., Feb. 19, 2015, p. 124-139.

[NPL 2] Tsuyoshi KONDOH, Shingo KASHIMA, Masami UENO, "A Study of Requirements on Authentication and Traffic Control for IoT Devices", IEICE technical report, The Institute of Electronics, Information and Communication Engineers, Oct. 20, 2016, Vol. 116, No. 251, p. 15-18

SUMMARY OF THE INVENTION

Technical Problem

Conventional traffic control is often performed using signature matching or a blacklist. A signature is a pattern of distinctive character strings that are used in unauthorized communication and are included in a packet. In signature matching, communication of a packet including a character string that matches a preset signature is determined to be unauthorized communication. A blacklist is a list of piece of information that specify, in advance, websites, business operators, and the like that perform unauthorized communication. For example, conventionally, a technique for specifying the type and name of a device that has performed unauthorized communication, through signature matching, creating a blacklist, and then performing communication control based on the blacklist has been proposed.

However, according to such a technique, it is assumed that signatures and blacklists are known in advance.

An embodiment according to the disclosure is made in view of the foregoing, and an object thereof is to realize control that matches the communication state of each IoT device without relying on external information.

Means for Solving the Problem

The communication control apparatus disclosed herein includes a collection control unit, an analysis unit, and a coordination unit. The collection control unit collects communication performed with a device connected to a subordinate network, and controls communication performed by the device based on a first control condition. The analysis unit analyzes the communication collected by the collection control unit to extract device identification information indicating characteristics of the communication performed by the device. The analysis unit also specifies a device name of the device and the first control condition corresponding to a normal communication range extracted from the device identification information, based on the device identification information. The coordination unit transmits at least part of first shared information in which the device name and the first control condition specified by the analysis unit and the device identification information are associated with each other, to an outside of the subordinate network.

Effects of the Invention

The communication control apparatus, the communication control method, and the communication control program disclosed herein realize control that matches the communication state of each IoT device without relying on external information.

DESCRIPTION OF EMBODIMENTS

Figure 1:
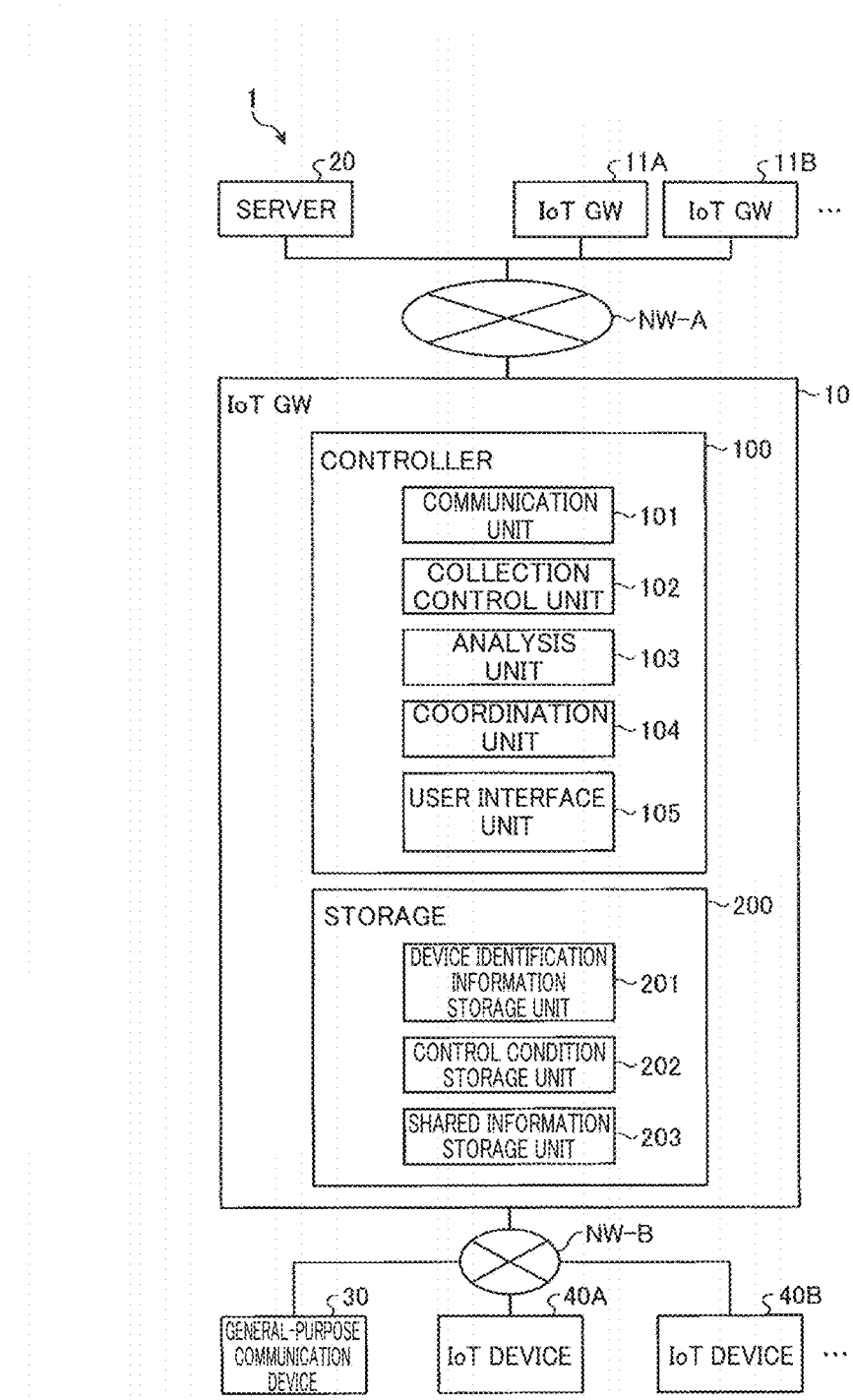
FIG. 1 is a diagram showing an example of a configuration of a communication control system according to an embodiment.

Hereinafter, embodiments of an apparatus, a method, and a program that are to be disclosed will be described in detail with reference to the drawings. Note that the present invention is not limited to the embodiments. The embodiments may be combined with each other as appropriate.

Conventional Communication Control for IoT Devices

Before describing the embodiments, the following further describes communication control for IoT devices performed using a signature and a blacklist.

As described above, if a signature and a blacklist are used to perform communication control, it is necessary to acquire the signature and the blacklist before starting the communication control. For example, a service provider that provides an IoT service acquires information such as a signature and a blacklist from another business operator. Alternatively, for example, a service provider acquires information such as a signature and a blacklist by performing information analysis by themselves.

However, when a service provider tries to specify an IoT device that a user uses to receive a service, based on information such as a signature, there are the following problems.

First, when acquiring information such as a signature from another business operator, the service provider needs to first specify the type of the device for which information is to be acquired. Therefore, if the service provider cannot specify, in advance, the device used by the user who utilizes the service, the service provider cannot acquire information from another business operator.

Also, if the service provider tries to analyze information by themselves in order to specify the device, it takes time to purchase and analyze the device, and the service provider cannot promptly take measures regarding communication performed by a new device.

Also, if the service provider collects information regarding communication actually performed by the user using a device, and asks another business operator to analyze information such as a signature, the service provider needs to provide information regarding the user's communication to an external entity, and accordingly concerns regarding security arise.

Also, if the service provider tries to analyze information regarding communication by themselves, the amount of information to be referred to is enormous, the scale of the system needs to be huge, and costs increase.

Furthermore, if the service provider tries to control communication performed by the user using a device, based on information such as a blacklist, the following problems occur.

First, information such as a general-purpose blacklist or the like is not created based on the characteristics of each IoT device. Therefore, if a general-purpose blacklist is used to perform communication control, it is impossible to sufficiently consider device characteristics when realizing communication control.

Also, with a conventional blacklist or the like, it is impossible to address a security threat that has not been known, such as a new attack scheme. Also, it takes a long time to create a blacklist or the like that addresses a new attack scheme. Therefore, it is impossible to promptly address a new security threat.

Also, if the service provider asks an external entity to create a blacklist or the like that is based on information regarding the user's actual communication, the service provider needs to provide information regarding a service environment, provided by the service provider themselves, to the external entity, and accordingly concerns regarding security arise.

Also, when the service provider creates a blacklist or the like based on information regarding the user's actual communication by themselves, the amount of information to be referred to is enormous in this case as well, and the scale of the system needs to be huge, and costs increase.

As described above, specification of a device name using a conventional signature and blacklist, and a communication control method that is based on the specified device name, have problems in terms of securing of information, prompt addressing, security, costs, and so on.

Example of Configuration of Communication Control System 1 According to Embodiment FIG. 1 is a diagram showing an example of a configuration of a communication control system 1 according to an embodiment. The communication control system 1 according to the embodiment includes an IoT GW (gateway) 10 (hereinafter also referred to as a communication control apparatus). The IoT GW 10 is connected to other IoT GWs 11A, 11B, and so on, and a server 20, via an external network NW-A. The IoT GW 10 is also connected to a general-purpose communication device 30 and IoT devices 40A, 40B, and so on via a network NW-B that is different from the external network NW-A.

The IoT GW 10 controls communication between subordinate devices connected thereto via the network NW-B, and external devices connected thereto via the external network NW-A. The IoT GW 10 is, for example, an apparatus provided by a service provider that provides an IoT service. The IoT GW 10 receives information from the general-purpose communication device 30 and the IoT devices 40A, 40B, and so on, which are subordinate devices, and transmits the information to the server 20. The IoT GW 10 also controls communication performed by the general-purpose communication device 30 and the IoT devices 40A, 40B, and so on, based on, for example, information received from the general-purpose communication device 30 and the IoT devices 40A, 40B, and so on, which are subordinate devices, and preset information. Note that the IoT GW 10 according to the present embodiment specifies the types (IoT device classes described below) of subordinate devices, and performs communication suppression processing on devices specified as IoT devices. On the other hand, the IoT GW 10 does not perform communication suppression processing on the general-purpose communication device 30, which is specified as a device other than an IoT device. This is because the general-purpose communication device 30 often performs communication in response to user operations, and it is difficult to standardize such communication.

Through communication control processing, the IoT GW 10 performs processing for specifying the device names of subordinate devices, processing for specifying control conditions that are to be applied to the devices of which the device names have been specified, and processing for controlling communication performed by the devices by applying the specified control conditions. Processing for controlling communication includes processing for blocking a device that has caused a communication anomaly from performing communication, and processing for notifying the user of the occurrence of abnormal communication.

The IoT GW 10 also autonomously shares information with the other IoT GWs 11A, 11B, and so on without being controlled by a host device (e.g. the server 20). The IoT GW 10 shares information with the other IoT GWs 11A, 11B, and so on in a decentralized configuration, using a blockchain or the like. The IoT GW 10 shares, for example, the device names of the general-purpose communication device 30 and the IoT devices 40A, 40B, and so on, which are subordinate devices, and control conditions, with the other IoT GWs 11A, 11B, and so on.

The IoT GWs 11A, 11B, and so on are devices that each have functions and configuration that are similar to those of the IoT GW 10. The IoT GWs 11A, 11B, and so on control subordinate IoT devices other than the IoT devices 40A, 40B, and so on controlled by the IoT GW 10. Although FIG. 1 shows two IoT GWs 11A and 11B, the number of IoT GWs connected to the IoT GW 10 via the external network NW-A is not specifically limited. Hereinafter, when the IoT GWs 11A, 11B, and so on need not be distinguished from each other, the IoT GWs 11A, 11B, and so on are collectively denoted as IoT GWs 11.

The server 20 is an information processing apparatus that is managed by a service provider that provides the IoT GW 10. The configuration of the server 20 is not specifically limited. For example, the server 20 may be physically one server, or a virtual server that is virtually constructed across a plurality of servers.

The general-purpose communication device 30 is an information processing terminal that is connected to the IoT GW 10 via the network NW-B and communicates with external entities. The general-purpose communication device 30 is, for example, a personal computer (PC), a laptop computer, a smartphone, a personal digital assistant (PDA), or the like. The general-purpose communication device 30 transmits and receives various kinds of information to and from external devices via the external network NW-A in response to user operations. In the embodiment described below, the general-purpose communication device 30 performs communication with external entities via the IoT GW 10. Although FIG. 1 shows one general-purpose communication device 30, the number of general-purpose communication devices 30 connected to the IoT GW 10 is not specifically limited, and a plurality of general-purpose communication device 30 may be connected to the IoT GW 10.

The IoT devices 40A, 40B, and so on are devices that are to be controlled by the IoT GW 10. The IoT devices 40A, 40B, and so on are, for example, sensors such as a temperature sensor, an illuminance sensor, a human detection sensor, an open/close sensor, and the likes arranged in a predetermined space at predetermined positions. Alternatively, for example, the IoT devices 40A, 40B, and so on are information processing apparatuses of which the power consumption is controlled through an IoT service. Alternatively, for example, the IoT devices 40A, 40B, and so on are imaging apparatuses that capture images of a predetermined space and transmit the images to the IoT GW 10. Although FIG. 1 shows two IoT devices, the number of IoT devices connected to the IoT GW 10 as subordinate devices thereof is not specifically limited. Hereinafter, when the IoT devices 40A, 40B, and so on need not be distinguished from each other, IoT devices 40A, 40B, and so on are collectively denoted as IoT devices 40.

The external network NW-A is a communication network that connects the IoT GW 10 and the external device with each other so as to be able to communicate with each other. The external network NW-A is, for example, the Internet, an intranet, a local area network (LAN), a wide area network (WAN), or the like. The external network NW-A may be a wired network, a wireless network, or a combination thereof.

The network NW-B is a communication network that connects the IoT GW 10 and devices that are to be controlled by the IoT GW 10 with each other so as to be able to communicate with each other. For example, when the temperature in an office is to be managed through an IoT service, the network NW-B is a communication network that connects the IoT GW 10 and a temperature sensor (an IoT device) in the office with each other so as to be able to communicate with each other. The type of the network NW-B is not specifically limited. The network NW-B may be, for example, the Internet, an intranet, a local area network (LAN), a wide area network (WAN), or the like, and may be a wired network, a wireless network, or a combination thereof.

Examples of Configuration and Functions of IoT GW 10

Examples of the configuration and functions of the IoT GW 10 will be further described with reference to FIG. 1. The IoT GW 10 includes a controller 100 and a storage 200.

The controller 100 controls communication control processing performed by the IoT GW 10. An electronic circuit such as a CPU (Central Processing Unit) or an MPU (Micro Processing Unit), or an integrated circuit such as an ASIC (Application Specific Integrated Circuit) or an FPGA (Field Programmable Gate Array) may be used as the controller 100. Also, the controller 100 includes a storage unit that stores a program that defines processing procedures or the like of the IoT GW 10, and control data. The controller 100 functions as various processing units as a result of various programs running.

The storage 200 is a storage device that stores various kinds of data. The storage 200 may be a rewritable semiconductor memory such as a RAM (Random Access Memory), a flash memory, or the like. The device used as the storage 200 is not specifically limited.

Description of Various Kinds of Information

First, information used by the communication control system 1 according to the present embodiment will be described.

A "device name" is information that specifies one of the general-purpose communication device 30 and the IoT devices 40A, 40B, and so on. For example, a "device name" is information that specifies the function, performance, the type, and so on of a device, such as the general name, unique name, or the like of a device corresponding thereto. For example, iphone (registered trademark), ipad (registered trademark), and so on are device names. Furthermore, if devices that are connected to the IoT GW 10 as subordinate devices thereof are a plurality of devices used by a family or devices used in a company, each device name may include a name that specifies the user. Devices that are specified by the same "device name" presumably achieve similar communication performance and a similar communication pattern.

"Device identification information" is information that indicates characteristics of communication performed by the general-purpose communication device 30 and the IoT devices 40A, 40B, and so on. For example, "device identification information" is information that indicates a communication pattern of a device. "Device identification information" is information that can be acquired by the IoT GW 10 tracking and analyzing communication performed by a device. "Device identification information" is, for example, an open port, a communication destination, a communication frequency, a communication protocol, a communication data size, payload characteristics, and so on of each device. Also, "device identification information" is, for example, the domain name of the communication destination of a device.

"Device unique information" is information that is unique to, and can uniquely specify, one of the general-purpose communication device 30 and the IoT devices 40A, 40B, and so on, such as a MAC address, an IP address, or the like.

An "IoT device class" is information that indicates whether a device that communicates with the IoT GW 10 is an IoT device or another device. In the present embodiment, information that distinguishes the IoT devices 40 and the general-purpose communication device 30 from each other is referred to as a "IoT device class". An "IoT device class" indicates, for example, an "IoT device" or a "non-IoT device". Although a method for specifying an "IoT device class" is not specifically limited, the IoT GW 10 specifies an IoT device class based on device identification information. In the present embodiment, an IoT device class is also specified through processing for specifying a device name.

A "control condition" is information that indicates a normal communication range of a device. A "control condition" is extracted by the IoT GW 10 analyzing (learning) communication performed by the general-purpose communication device 30 and the IoT devices 40A, 40B, and so on. In the present embodiment, a "control condition" serves as a so-called whitelist for communication. A "control condition" may also be referred to as a filtering condition.

Communication that does not meet a "control condition" is referred to as "abnormal communication". Communication that is not controlled based on a "control condition" is referred to as "regular communication".

For example, if the number of communication destinations of an IoT device 40, which is the subject of analysis (learning), is 1 during a predetermined period in which the IoT device 40 performs "regular communication", a control condition is "the number of communication destinations of an IoT devices 40=1". In this case, if an IoT device 40 tries to communicate with a plurality of communication destinations after the IoT GW 10 has started communication control, the IoT GW 10 determines that "abnormal communication" of the IoT device 40 has occurred. Also, for example, if a communication period of an IoT device 40 that is the subject of analysis (learning), in which the IoT device 40 performs "regular communication", is limited to predetermined business hours in a predetermined period, a control condition is "the communication period of an IoT device 40=business hours". In this case, if an IoT device 40 tries to perform communication during non-business hours after the communication control system 1 has started communication control, the IoT GW 10 determines that "abnormal communication" of the IoT device 40 has occurred.

Information Stored in Storage 200

The storage 200 includes a device identification information storage unit 201, a control condition storage unit 202, and a shared information storage unit 203.

Figure 2:
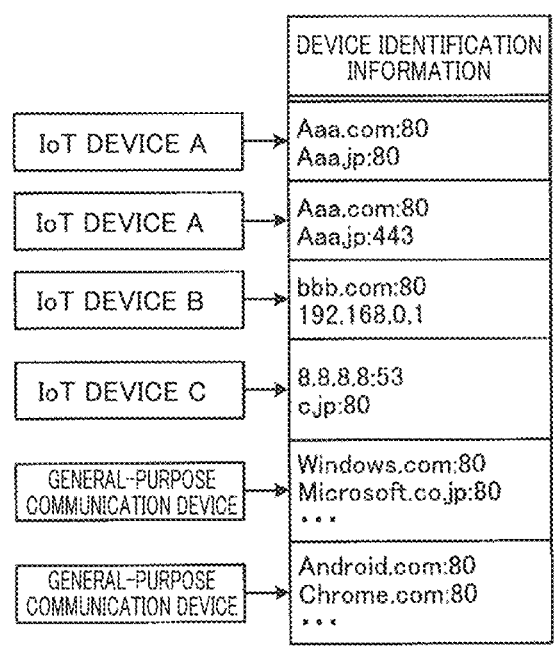
FIG. 2 is a diagram showing examples of pieces of device identification information that are extracted at an IoT GW according to the embodiment.

The device identification information storage unit 201 stores device identification information regarding the general-purpose communication device 30 and the IoT devices 40 specified by analyzing communication performed by the general-purpose communication device 30 and the IoT devices 40. FIG. 2 is a diagram showing examples of pieces of device identification information that are extracted at the IoT GW 10 according to the embodiment. In the examples shown in FIG. 2, "Aaa.com:80 Aaa.jp:80" is stored as "device identification information" corresponding to "IoT device A", for example. The example in FIG. 2 shows two instances of "IoT device A", which indicates that a plurality of devices of the same type are arranged, and these devices achieve the same level of performance and have the same characteristics. For example, this is a case in which two sensors with the same model number are connected to the IoT GW 10 as subordinate devices.

Figure 3:
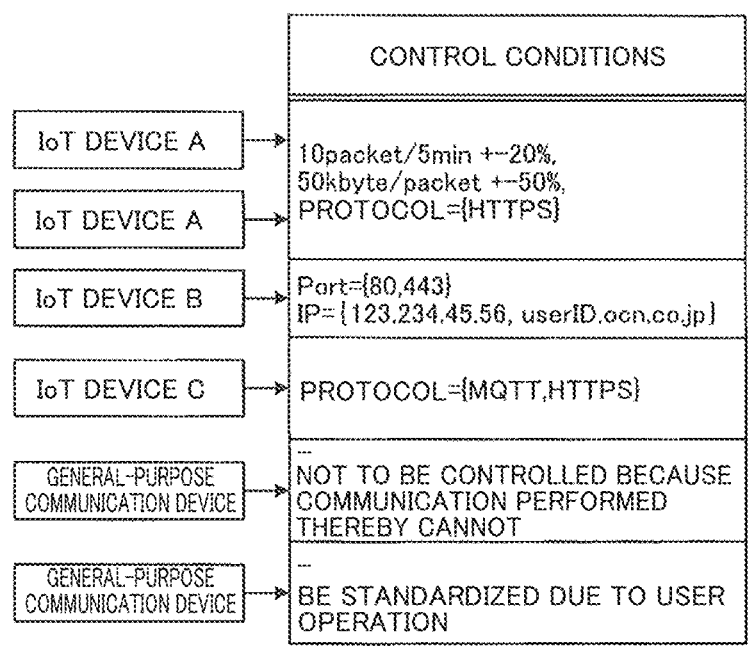
FIG. 3 is a diagram showing examples of control conditions that are specified at the IoT GW according to the embodiment.

The control condition storage unit 202 stores control conditions for the general-purpose communication device 30 and the IoT devices 40. FIG. 3 is a diagram showing examples of control conditions that are specified at the IoT GW 10 according to the embodiment. In the examples shown in FIG. 3, "10 packet/5 min±20%, 50 kbyte/packet±50%, protocol {HTTPS}" is stored as a control condition corresponding to each "IoT device A". This condition indicates that communication performed by an IoT device A is regarded as being within a normal communication range if 10±20% packets are transmitted per five minutes. The condition also indicates that communication performed by an IoT device A is regarded as being within a normal communication range if the size of each packet is 50±50% Kbytes. The condition also indicates that communication performed by an IoT device A is regarded as being within a normal communication range if HTTPS is used as a protocol. In the examples shown in FIG. 3, the same control condition is stored in association with two instances of "IoT device A".

The shared information storage unit 203 stores shared information that is shared by the IoT GW 10 with another IoT GW 11. Shared information includes, for example, "device unique information" and "device identification information" as "keys". Shared information also includes a "IoT device class", a "device name", and a "control condition" as "values".

Figure 4:
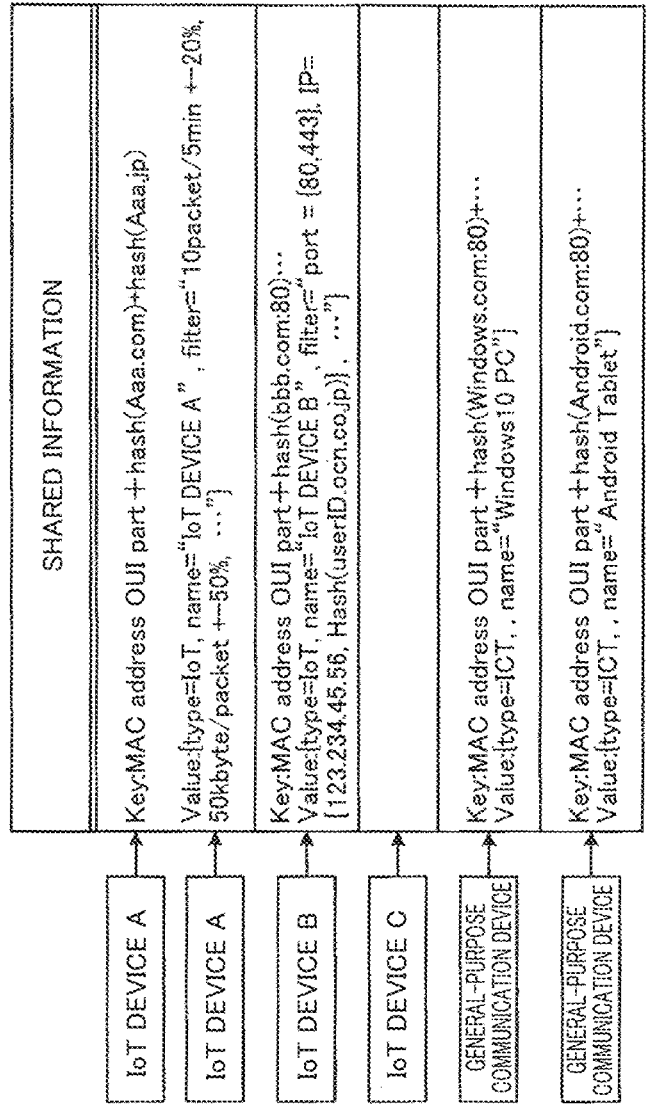
FIG. 4 is a diagram showing examples of pieces of shared information that are generated at the IoT GW according to the embodiment.

FIG. 4 is a diagram showing examples of pieces of shared information that are generated at the IoT GW 10 according to the embodiment. In the examples shown in FIG. 4, "MAC address OUI part+hash(Aaa.com)+hash(Aaa.jp)" is stored as a "key" of shared information regarding "IoT device A". Here, "MAC address OUI part" is device unique information. "hash(Aaa.com)+hash(Aaa.jp)" is obtained by hashing unique information included in device identification information. Furthermore, "{type=IoT, name="IoT device A", filter="10 packet/5 min±20%, 50 kbyte/packet±50%, ... "}" is stored as "value". Here, "type=IoT" indicates that an "IoT device class" is "IoT device". Also, "name=" IoT device A" indicates that "device name" is "IoT device A". Also, "filter="10 packet/5 min±20%, 50 kbyte/packet±50%" indicates the details of a control condition. In this case, the condition indicates that communication is regarded as being within a normal communication range if the number of communication packets per five minutes is 10±20%, and the size of each packet is 50±50% Kbytes.

Note that the timing and mode of storing device identification information, control conditions, and shared information are not specifically limited. Also, if connection and communication by a given device is denied by the user, the storage 200 stores information indicating that fact. If shared information is acquired from another IoT GW 11, the storage 200 may also store information that specifies the IoT GW 11 that is the transmission source of the shared information, in addition to the pieces of information shown in FIGS. 2 to 4. The storage 200 may also store the lengths of the learning periods during which the IoT GWs 10 and 11 specify device names and control conditions, in association with the specified device names and control conditions.

Examples of Functions and Configurations of Units Included in Controller 100

The controller 100 includes a communication unit 101, a collection control unit 102, an analysis unit 103, a coordination unit 104, and a user interface (UI) unit 105.

The communication unit 101 is a communication interface that enables the IoT GW 10 to perform communication via the external network NW-A. The communication unit 101 includes, for example, a switch, a router, and so on. The communication unit 101 receives information transmitted from the external network NW-A, and transmits the received information to the functional units, namely the collection control unit 102, the analysis unit 103, the coordination unit 104, and the user interface unit 105, according to predetermined settings. Also, the communication unit 101 transmits information received from the functional units, namely the collection control unit 102, the analysis unit 103, the coordination unit 104, and the user interface unit 105, to the outside according to predetermined settings.

The collection control unit 102 enables the IoT GW 10 to perform communication via the network NW-B. The collection control unit 102 cooperates with the communication unit 101 to transmit and receive information to and from the general-purpose communication device 30 and the IoT devices 40, which are arranged as subordinate devices of the IoT GW 10.

The collection control unit 102 collects information regarding communication performed by the general-purpose communication device 30 and the IoT devices 40 via the network NW-B. Upon a device that is not recorded on the storage 200 connecting the IoT GW 10, the collection control unit 102 detects the device as a new device. Upon detecting connection of a new device, the collection control unit 102 performs regular communication with the device for a predetermined period to collect information regarding communication. Thereafter, the collection control unit 102 transmits the collected information to the analysis unit 103 together with an instruction to analyze the new device.

The collection control unit 102 controls communication with the general-purpose communication device 30 and the IoT devices 40A, 40B, and so on according to control conditions set based on the result of processing performed by the analysis unit 103. For example, upon a device that is not permitted to perform communication connecting to the IoT GW 10, the collection control unit 102 blocks communication with the device. Alternatively, for example, the collection control unit 102 blocks communication with an IoT device 40 that has performed communication that does not meet predetermined control conditions. Alternatively, for example, the collection control unit 102 detects an IoT device 40 that has performed communication that does not meet predetermined control conditions, and transmits an alert to the user. Alternatively, for example, upon communication that does not meet predetermined control conditions occurring, the collection control unit 102 instructs the analysis unit 103 to reanalyze (relearn) communication performed by the IoT device 40 that has brought about the communication.

The analysis unit 103 receives communication performed by the general-purpose communication device 30 and the IoT devices 40A, 40B, and so on collected by the collection control unit 102, from the collection control unit 102. The analysis unit 103 analyzes the received communication. For example, if the collection control unit 102 instructs the analysis unit 103 to analyze a new device, the analysis unit 103 extracts a communication pattern of the new device from the communication. A communication pattern is information that characterizes communication performed by the device. A communication pattern is, for example, device identification information extracted from information regarding communication performed during a predetermined period. Based on the extracted device identification information, the analysis unit 103 specifies the device name and so on of the device. The analysis unit 103 also specifies the normal communication range of the device based on the extracted device identification information. Based on the specified normal communication range, the analysis unit 103 specifies control conditions for the device. The specified device name and control conditions are stored in the storage 200.

The analysis unit 103 also performs reanalysis (relearning) of communication performed by the IoT device 40 that has brought about the communication that does not meet the control conditions. The analysis unit 103 receives communication performed by the IoT device 40, including communication that does not meet the control conditions, from the collection control unit 102, and performs reanalysis to specify control conditions. Note that the analysis unit 103 can refer to shared information generated by the IoT GW 10 and shared information acquired from other IoT GWs 11 to specify the device name and the control conditions and to reanalyze the control conditions. The device name and the control conditions specified by the analysis unit 103 are stored in the storage 200 according to the settings, and are transmitted to each functional unit.

The coordination unit 104 shares the device name and the control conditions specified based on the result of analysis performed by the analysis unit 103, with other IoT GWs 11. Also, the coordination unit 104 shares the device name and the control conditions specified on another IoT GW 11 with other IoT GWs 11. To share means that the IoT GW 10 can refer to the device name, the control conditions, and so on specified on an IoT GW 11, and the IoT GWs 11 can refer to the device name, the control conditions, and so on specified on the IoT GW 10.

The coordination unit 104 generates shared information from the device name, the control conditions, and so on specified on the IoT GW 10. Thereafter, the coordination unit 104 transmits all or part of the shared information to other IoT GWs 11. The coordination unit 104 also receives all or part of the shared information from another IoT GW 11. Note that the mode of sharing is not specifically limited. For example, every time a part of the shared information is specified on the IoT GW 10, the part may be transmitted to another IoT GW 11, or transmitted in response to a request from another IoT GW 11. Also, all of the shared information may be transmitted, or part of the shared information may be transmitted.

The user interface unit 105 provides a user with a various kinds of information, and receives an input from the user. The user interface unit 105 may include, for example, a liquid crystal screen, a touch panel, a speaker, a microphone, and so on. The user interface unit 105 displays the results of analysis performed by the analysis unit 103, on the screen. The user interface unit 105 also displays the control conditions received by the coordination unit 104 from another IoT GW 11, on the screen. The user interface unit 105 also displays information regarding the IoT device 40 that has brought about communication that does not meet the control conditions, on the screen. Also, when communication that does not meet the control conditions occur, the user interface unit 105 transmits a notification indicating the fact to the user. The user interface unit 105 also receives a device name and so on input by the user. The user interface unit 105 may display information on the IoT GW 10, or display information on, for example, a user terminal registered in advance.

Outline of Communication Control Processing

Figure 5:
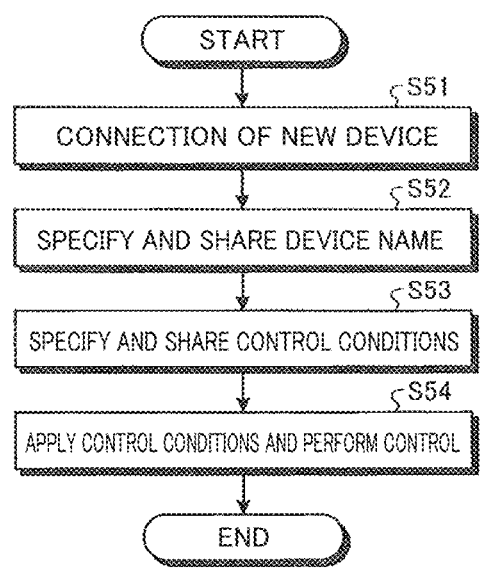
FIG. 5 is a flowchart showing an example of an outline of processing that is performed in a communication control system according to the embodiment.

FIG. 5 is a flowchart showing an example of an outline of processing that is performed in the communication control system 1 according to the embodiment. In the communication control system 1, upon a new general-purpose communication device 30 or a new IoT device 40 being connected to the IoT GW 10, first, the collection control unit 102 of the IoT GW 10 detects the connection of the new device (step S51). Thereafter, the collection control unit 102 causes the new general-purpose communication device 30 or the new IoT device 40 to perform regular communication, and collects information regarding the communication. Based on the collected information, the analysis unit 103 specifies the device name of the general-purpose communication device 30 or the IoT device 40. The coordination unit 104 transmits the device name specified by the analysis unit 103 to another IoT GW 11 to share the device name therewith (step S52). Furthermore, the analysis unit 103 specifies control conditions that are to be applied to the IoT device 40. The coordination unit 104 transmits the control conditions specified by the analysis unit 103 to another IoT GW 11 to share the control conditions therewith (step S53). Upon the device name and the control conditions being specified, the IoT GW 10 applies the control conditions to the IoT device 40 and performs communication control based on the combination of the specified device name and control conditions (Step S54). This is an example of an outline of processing that is performed in the communication control system 1 according to the embodiment.

Example of Device Name Specification Processing

Figure 6:
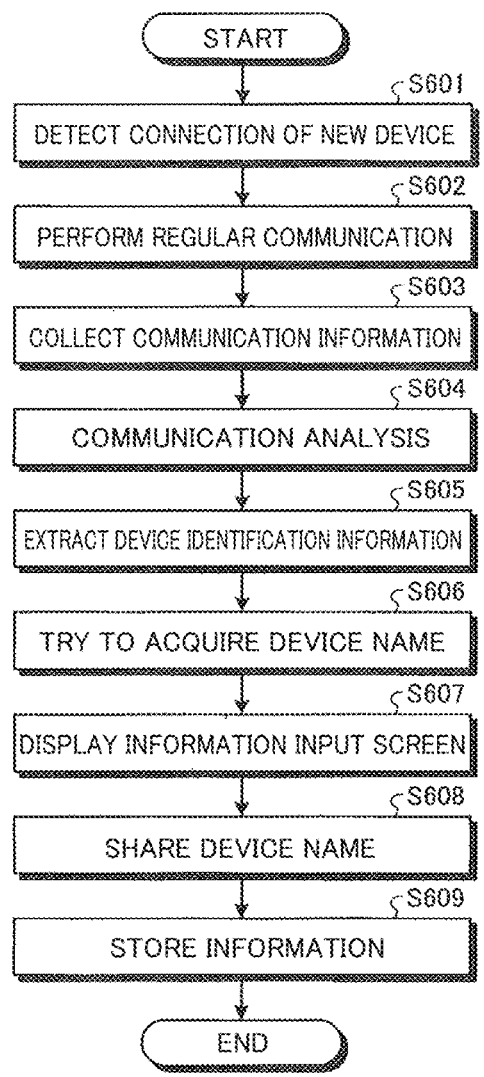
FIG. 6 is a flowchart showing an example of processing that is performed in the communication control system according to the embodiment to specify a device name.

FIG. 6 is a flowchart showing an example of processing that is performed in the communication control system 1 according to the embodiment to specify a device name. Upon a new general-purpose communication device 30 or a new IoT device 40 being connected to the IoT GW 10 as a subordinate device thereof, the collection control unit 102 first detects the connection of the general-purpose communication device 30 or the IoT device 40 (step S601). Thereafter, the collection control unit 102 causes communication to be performed based on the definition of the general-purpose communication device 30 or the IoT device 40 for a fixed period (step S602). Here, the fixed period for which communication is performed is a learning period for specifying the device name of the general-purpose communication device 30 or the IoT device 40. Therefore, the fixed period may be set in view of the balance between the accuracy of the result of specification and the response speed of communication. For example, the fixed period is set to be five minutes. The collection control unit 102 collects information regarding communication performed by the IoT device 40, for the fixed period (step S603). Thereafter, the collection control unit 102 passes the collected information regarding communication to the analysis unit 103.

The analysis unit 103 analyzes the information regarding communication passed thereto (step S604). For example, the analysis unit 103 extracts information that indicates characteristics of the communication through analysis. For example, the analysis unit 103 extracts device identification information regarding the IoT device 40 (step S605). Next, the analysis unit 103 refers to the information stored in the storage 200, and tries to acquire the device name associated with the extracted device identification information (step S606). If the analysis unit 103 can extract the device name, the analysis unit 103 transmits the device name to the user interface unit 105. If the analysis unit 103 cannot extract the device name from the storage 200, the analysis unit 103 transmits information indicating the fact to the user interface unit 105.

The user interface unit 105 displays an information input screen according to the information transmitted from the analysis unit 103 (step S607). If the analysis unit 103 has extracted the device name, the user interface unit 105 displays an information input screen for displaying the extracted device name as a candidate device name. The information input screen is a screen from which the user can input information indicating whether or not to select the displayed candidate device name. The information input screen is configured such that the user can input a device name other than the candidate device name therefrom. On the other hand, if the analysis unit 103 has not extracted the device name, the user interface unit 105 does not display a candidate device name, and displays an information input screen from which the user can input a device name. Note that the information input screen may be a display screen of the display unit included in the IoT GW 10, or a display screen on another user terminal registered in the IoT GW 10 in advance. If this is the case, the user interface unit 105 may be configured to transmit an email to the user terminal, and the user causes the information input screen to be displayed via a link or the like on the email. Also, the user interface unit 105 may compose an information input screen such that the user can select whether or not to permit the general-purpose communication device 30 or the IoT device 40 to perform communication on the information input screen. The user interface unit 105 transmits the result of the user input from the information input screen, to the coordination unit 104.

The coordination unit 104 transmits information corresponding to the result of the user input, transmitted from the user interface unit 105, to another IoT GW 11. For example, the coordination unit 104 transmits shared information in which the device identification information extracted by the analysis unit 103, the device name input by the user, and the IoT device class are associated with each other, to another IoT GW 11, to share the information with the IoT GW 11 (step S608, "share the device name"). When transmitting the shared information to another IoT GW 11, the coordination unit 104 deforms the information to be information that can be disclosed. Information that can be disclosed is information formed by deleting or hashing information with which the usage location or the user name of the general-purpose communication device 30 or the IoT device 40 can be specified. For example, information that can be disclosed is information formed by deleting or hashing information regarding the connection destination IP, which is different for each user, the usage hours, and so on. Thus, the device name specified at the IoT GW 10 can be swiftly shared with another IoT GW 11. Therefore, it is preferable that the device name is transmitted and shared in real time. Thereafter, the coordination unit 104 stores the device identification information, device unique information, and IoT device class extracted by the analysis unit 103, and the device name, the presence or absence of communication permission, and so on received by the user interface unit 105, in the storage 200 in association with each other (step S609). Thus, processing performed to specify and share a device name when a new device is connected is complete.

Figure 7:
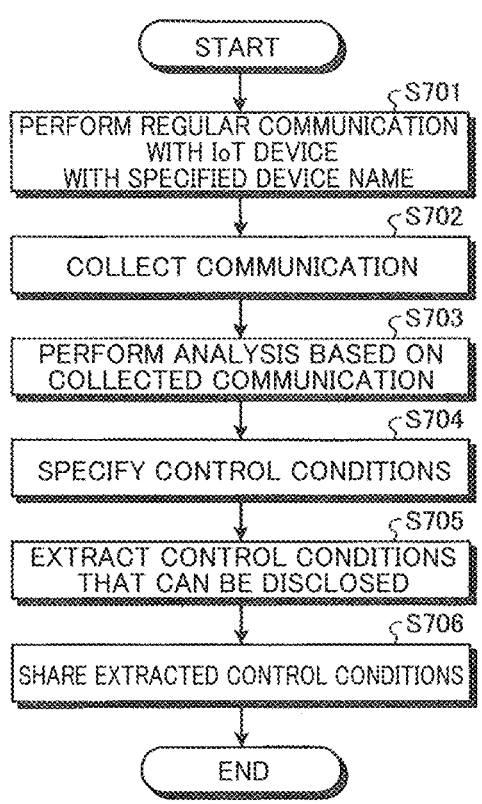
FIG. 7 is a flowchart showing an example of first control condition specification processing that is performed in the communication control system according to the embodiment.

First Control Condition Specification Processing: Specification of Control Conditions Performed by the GW FIG. 7 is a flowchart showing an example of first control condition specification processing that is performed in the communication control system 1 according to the embodiment. The first control condition specification processing is performed on the IoT device 40 for which the device name specification processing shown in FIG. 6 has been completed.

First, the IoT GW 10 performs regular communication with the IoT device 40 with the specified device name (step S701). During regular communication, the collection control unit 102 collects communication performed by the IoT devices 40 (step S702). Thereafter, the collection control unit 102 sends the collected communication to the analysis unit 103. The analysis unit 103 performs analysis based on the communication collected by the collection control unit 102 (step S703). For example, the analysis unit 103 analyzes communication performed during a predetermined period such as one day or one week and extracts device identification information regarding the IoT device 40. The analysis unit 103 specifies the normal communication range of the IoT device 40 based on the extracted device identification information. Thus, the analysis unit 103 specifies the control conditions for the IoT device 40 (step S704). The analysis unit 103 transmits the extracted control conditions to the collection control unit 102. Also, the analysis unit 103 transmits the extracted control conditions to the coordination unit 104.

The collection control unit 102 performs communication control on the IoT device 40 based on the received control conditions. The coordination unit 104 extracts information that can be disclosed, from the control conditions (step S705). Thereafter, the coordination unit 104 transmits the extracted information to another IoT GW 11 to share the information therewith as shared information (step S706). Thus, the first control condition specification processing is complete.

Figure 8:
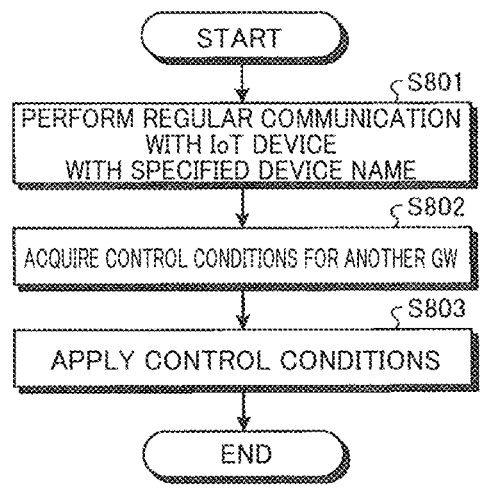
FIG. 8 is a flowchart showing an example of second control condition specification processing that is performed in the communication control system according to the embodiment.

Second Control Condition Specification Processing: Specification Using Control Conditions for Another GW FIG. 8 is a flowchart showing an example of second control condition specifying processing that is performed in the communication control system 1 according to the embodiment. The second control condition specification processing is performed when, for example, the processing capacity of the IoT GW 10 is too low to specify control conditions by itself. Also, the second control condition specification processing is performed when, for example, the traffic of the communication performed by an IoT device 40 is too high for the IoT GW 10 to perform analysis processing by itself. Also, the second control condition specification processing is performed when, for example, the IoT GW 10 takes a long time to analyze a new IoT device 40, in parallel with the analysis.

First, the IoT GW 10 performs regular communication with the IoT device 40 with the specified name (step S801). During regular communication, the coordination unit 104 acquires control conditions corresponding to the device name of the IoT device 40 from another IoT GW 11 (shared information) (step S802). The coordination unit 104 transmits the acquired control conditions to the collection control unit 102. The collection control unit 102 starts performing communication control on the IoT device 40 by applying the received control conditions thereto (step S803). Thus, the second control condition specification processing is complete.

The second control condition specification processing is useful when the processing performance of the IoT GW 10 is low, for example, because analysis processing for specifying the control conditions performed in the IoT GW 10 can be omitted. Also, when it takes a long time for the IoT GW 10 to complete analysis processing, it is possible to shorten the time during which communication control is not performed, by temporarily applying the control conditions specified by the other IoT GW 11, during the execution of analysis processing.

Note that, in the second control condition specification processing, the control conditions specified by the other IoT GW 11 are applied by the IoT GW 10 without change, under the condition that the device name is the same. Therefore, if the control conditions specified by the other IoT GW 11 include an error, normal communication may also be subjected to control by the IoT GW 10. Also, if a unique additional condition has been added to the control conditions by the other IoT GW 11, undesired communication control may be performed by the IoT GW 10. For example, if an additional condition that may allow for an intentional attack has been added to the conditions by the IoT GW 11, the IoT GW 10 cannot control malicious communication. Therefore, if only the second control condition specification processing is performed by the IoT GW 10, the control conditions are applied after applying a predetermined filter thereto in order to avoid performing undesired communication control.

Figure 9:
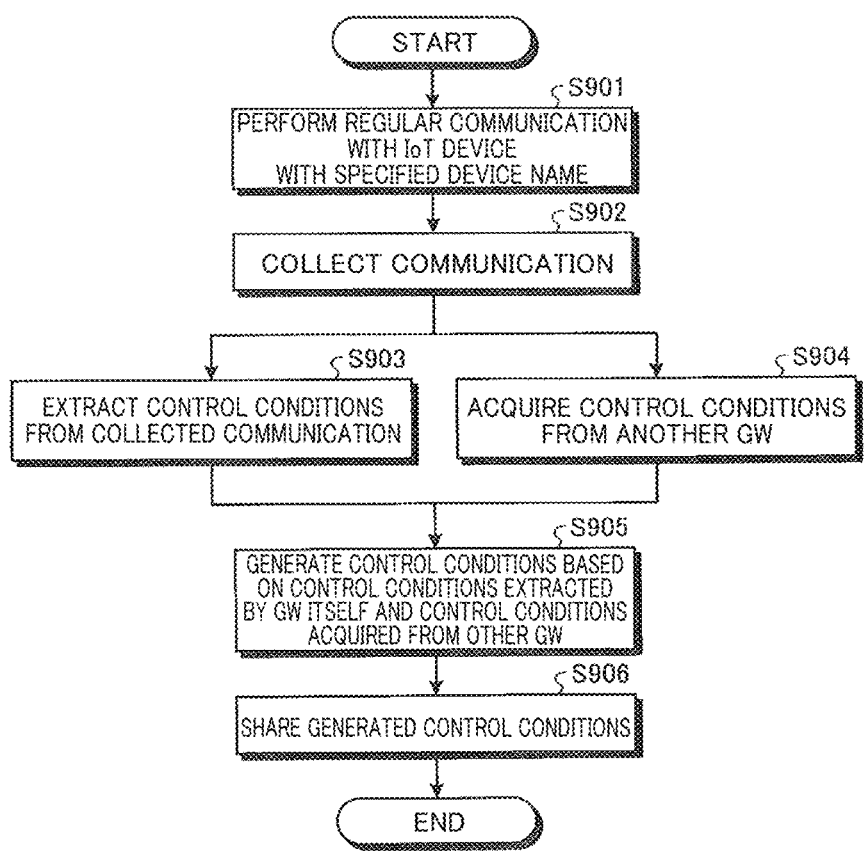
FIG. 9 is a flowchart showing an example of third control condition specification processing that is performed in the communication control system according to the embodiment.

Third Control Condition Specification Processing: Specification through Matching between Control Conditions for the GW and Another GW FIG. 9 is a flowchart showing an example of third control condition specifying processing that is performed in the communication control system 1 according to the embodiment. In third control condition specification processing, the IoT GW 10 specifies the control conditions to be applied, by performing matching between the control conditions specified by another IoT GW 11 and the control conditions specified by the IoT GW itself.

First, the IoT GW 10 performs regular communication with the IoT device 40 with the specified name (step S901).

During regular communication, the collection control unit 102 collects communication performed by the IoT device 40 (step S902). Thereafter, the collection control unit 102 sends the collected communication to the analysis unit 103 and the coordination unit 104.

The analysis unit 103 performs analysis based on the communication collected by the collection control unit 102. Thereafter, the analysis unit 103 extracts control conditions for the IoT device 40 (step S903). The analysis processing performed by the analysis unit 103 in the third control condition specification processing is the same as the analysis processing performed by the analysis unit 103 in the first control condition specification processing.

On the other hand, the coordination unit 104 that has received communication acquires control conditions corresponding to the same device name from another IoT GW 11 (step S904). The coordination unit 104 may, for example, extract control conditions corresponding to the same device name from shared information stored in the storage 200. Also, the coordination unit 104 may cause another IoT GW 11 to transmit control conditions corresponding to the same device name. The coordination unit 104 transmits the acquired control conditions to the analysis unit 103.

The analysis unit 103 performs matching between the control conditions extracted by the IoT GW 10 and the control conditions extracted by the IoT GW 11 and received from the coordination unit 104. Thereafter, the analysis unit 103 generates control conditions based on the control conditions extracted by the IoT GW 10 and the control condition extracted by the IoT GW 11 (step S905). For example, the analysis unit 103 generates the control conditions to be applied by performing an operation to compare the control conditions extracted by the IoT GW 10 with the control conditions extracted by the IoT GW 11.

Here, the pattern of the comparison operation performed by the analysis unit 103 can be set in advance according to the security level and the detection accuracy required by the IoT GW 10, for example. For example, when a high security level is required, the analysis unit 103 sets AND conditions of the control conditions extracted by the GW itself and the control conditions extracted by another GW as the control conditions to be applied. For example, when a high processing speed is required rather than security, the analysis unit 103 sets OR conditions of the control conditions extracted by the GW itself and the control conditions extracted by another GW as the control conditions to be applied. When AND conditions are applied, security improves, but the false positive rate also increases. In contrast, when OR conditions are applied, the number of detections of abnormal communication decreases and the number of alerts also decreases. However, misdetection may occur and security is reduced. Also, as with the second control condition specification processing, normal communication may also be controlled, or malicious communication may be overlooked, for example. Therefore, the pattern of the comparison operation is to be appropriately set according to the environment in which an IoT service is provided and the network environment.

The analysis unit 103 transmits the generated control conditions to the collection control unit 102. The collection control unit 102 starts performing communication control on the IoT device 40 based on the received control conditions.

Also, the analysis unit 103 transmits the generated control conditions to the coordination unit 104. The coordination unit 104 shares the received control conditions with another IoT GW 11 by transmitting the control conditions thereto via the external network NW-A (step S906). Thus, the third control condition specification processing is complete.

In this way, the IoT GW 10 can specify the control conditions to be applied to the IoT devices 40, which are subordinate devices thereof, by performing a different kind of processing depending on the situation.

Example of Processing Performed When Abnormal Communication is Detected

Next, Processing that is performed when abnormal communication occurs will be described. Here, abnormal communication is communication performed by an IoT device 40 that is not permitted to perform communication, or communication that does not fall within the normal communication range set based on the control conditions. For example, communication with traffic that is more than the traffic set based on the control conditions is referred to as abnormal communication. When a device that connects to the IoT GW 10 for the first time is detected, information corresponding to the device is not stored in the storage 200. Therefore, in the following example, such communication is also detected as abnormal communication.

First Control Pattern: Processing Performed at Connection of Unpermitted Device

Figure 10:
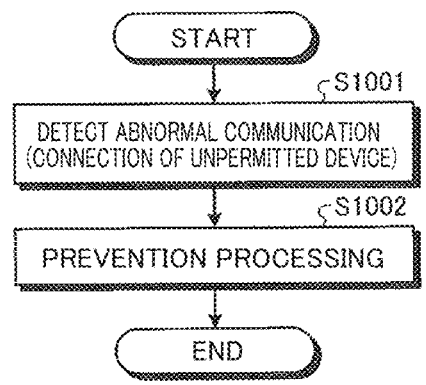
FIG. 10 is a flowchart showing an example of the flow of a first control pattern that is performed in the communication control system according to the embodiment.

FIG. 10 is a flowchart showing an example of the flow of a first control pattern that is performed in the communication control system 1 according to the embodiment. The first control pattern is processing that is performed when an IoT device 40 that is not permitted to perform communication tries to perform communication.

First, the collection control unit 102 detects abnormal communication (step S1001). In the example in FIG. 10, it is assumed that the collection control unit 102 has detected communication performed by an IoT device 40 that is recorded on the storage 200 as a device that is not permitted to perform communication. The collection control unit 102 performs prevention processing to prevent the IoT device 40 from performing communication (step S1002). For example, the collection control unit 102 blocks and stops communication performed by the IoT device 40. Alternatively, the collection control unit 102 notifies the user interface unit 105 of the fact that unpermitted communication performed by the IoT device 40 has been detected. The user interface unit 105 emits an alert in response to the notification. For example, the user interface unit 105 displays an alert message on the display unit of the IoT GW 10. Alternatively, for example, the user interface unit 105 transmits an email that notifies a user terminal registered in advance, of an alert. A method for emitting an alert is not specifically limited. Also, in prevention processing, the collection control unit 102 may only stop communication, or stop communication and emit an alert. Thus, processing according to the first control pattern is complete.

Figure 11:
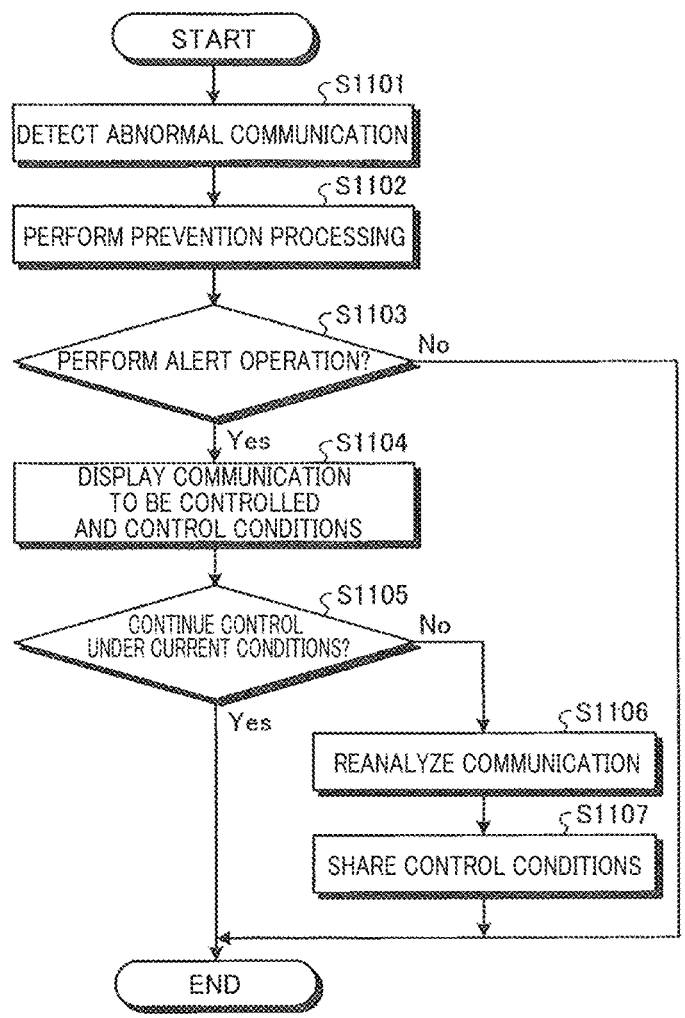
FIG. 11 is a flowchart showing an example of the flow of a second control pattern that is performed in the communication control system according to the embodiment.

Second Control Pattern: Processing in which Shared Information is Not Used when Abnormal Communication Occurs FIG. 11 is a flowchart showing an example of the flow of a second control pattern that is performed in the communication control system 1 according to the embodiment. According to the second control pattern, when abnormal communication that does not meet control conditions occurs, the IoT GW 10 sets the control conditions again according to a user instruction. According to the second control pattern, the IoT GW 10 sets the control conditions again by itself without using control conditions specified by another IoT GW 11.

First, the collection control unit 102 detects abnormal communication performed by an IoT device 40 (step S1101). In the example shown in FIG. 11, the collection control unit 102 detects abnormal communication that does not meet the control conditions. Thereafter, the collection control unit 102 performs prevention processing to prevent the IoT device 40 from performing communication (step S1102).

Here, the collection control unit 102 performs prevention processing to (1) block communication, (2) emits an alert to the user, or (3) block communication and emit an alert to the user, for example.

First, in the case of (1), the collection control unit 102 block, i.e., stop communication performed by the IoT device 40.

Next, in the case of (2), the collection control unit 102 first notifies the user interface unit 105 of the occurrence of abnormal communication performed by the IoT device 40. The notification includes, for example, information that specifies the IoT device 40 that has brought about abnormal communication, information that specifies the communication that has been determined as abnormal communication, the control conditions applied when abnormal communication was detected, or the like. The user interface unit 10 transmits the notified contents to a user terminal or the like registered in advance, via email or the like. Alternatively, the user interface unit 105 displays a notification screen on the display unit or the like of the IoT GW 10. In response to the notification from the user interface unit 105, the user can return a response to select to continue the control based on the current control conditions, or to change the control conditions.

In the case of (3), the processing of (1) is performed first, and thereafter the processing in (2) is performed.

When the collection control unit 102 performs the processing of (1), i.e., when the collection control unit 102 stops communication without performing an alert operation (step S1103, No), the processing is terminated. On the other hand, when the collection control unit 102 performs the processing of (2) or (3), i.e., when the collection control unit 102 performs an alert operation (step S1103, Yes), the collection control unit 102 performs an alert operation, and performs processing according to the user's response to the alert. When an alert action is to be performed, the collection control unit 102 notifies the user interface unit 105 to perform the above processing of (2). That is to say, the user interface unit 105 performs an alert operation to display the communication to be controlled and control conditions (step S1104). Thereafter, upon receiving a response from the user, the user interface unit 105 passes the received contents to the collection control unit 102. Based on the contents received from the user interface unit 105, the collection control unit 102 determines whether or not an instruction to continuously use the current control conditions has been received from the user (step S1105). If the collection control unit 102 determines that an instruction to continuously use the current control conditions has been received from the user (step S1105, Yes), processing is terminated. On the other hand, if the collection control unit 102 determines that an instruction to no longer use the current control conditions has been received from the user (step S1105, No), the collection control unit 102 collects information regarding communication performed by the IoT devices 40, and instructs the analysis unit 103 to perform reanalysis. The analysis unit 103 analyzes information regarding the communication performed in a predetermined period and determined as abnormal communication (step S1106), and extracts control conditions. The analysis unit 103 transmits the extracted control conditions to the coordination unit 104. The coordination unit 104 makes the control conditions disclosable, and thereafter transmits the control conditions to another IoT GW 11 to share the control conditions therewith (step S1107). The analysis unit 103 also transmits the extracted control conditions to the collection control unit 102. The collection control unit 102 performs communication control on the IoT device 40 by applying the received control conditions thereto.

Figure 12:
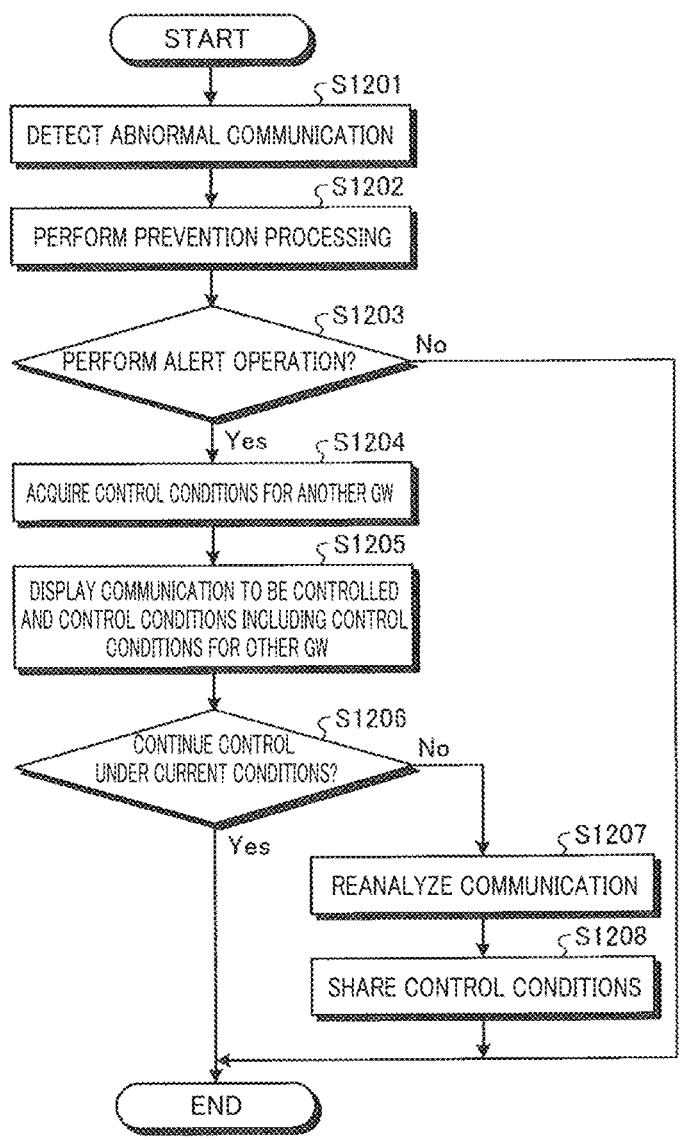
FIG. 12 is a flowchart showing an example of the flow of a third control pattern that is performed in the communication control system according to the embodiment.

Third Control Pattern: Processing in which Shared Information is Used when Abnormal Communication Occurs FIG. 12 is a flowchart showing an example of the flow of a third control pattern that is performed in the communication control system 1 according to the embodiment. According to the third control pattern, as with the second control pattern, when abnormal communication that does not meet control conditions occurs, the IoT GW 10 sets the control conditions again according to a user instruction. However, according to the third control pattern, the IoT GW 10 sets control conditions again using control conditions specified by another IoT GW 11.

First, the collection control unit 102 detects abnormal communication performed by an IoT device 40, which does not meet control conditions (step S1201). Thereafter, the collection control unit 102 performs prevention processing to prevent the IoT device 40 from performing communication (step S1202). The contents of prevention processing are the same as those of the prevention processing of the second control pattern. However, according to the third control pattern, when the collection control unit 102 emits an alert to the user, the collection control unit 102 provides the user with control conditions specified by another IoT GW 11 in addition to information specifying the IoT devices 40 that has brought about abnormal communication. Therefore, the collection control unit 102 determines whether or not to emit an alert to the user (step S1203), and terminates processing upon determining not to emit an alert (step S1203, No). On the other hand, upon determining to emit an alert (step S1203, Yes), the collection control unit 102 notifies the coordination unit 104. The coordination unit 104 acquires control conditions corresponding to the device name of the IoT device 40 from another IoT GW 11 (step S1204). The coordination unit 104 transmits the acquired control conditions to the user interface unit 105. The user interface unit displays the control conditions specified by the other IoT GW 11, as auxiliary information, while displaying the control conditions on the IoT GW 10 or the user terminal, as in the second control pattern (step S1205). The user can reconsider the control conditions on the IoT GW 10 while referring to the control conditions on the other IoT GW 11. Processing that is subsequent to step S1205 (steps S1206 to S1208) is the same as steps S1105 to S1107 in FIG. 11. Thus, processing according to the third control pattern is complete.

Note that when reanalysis of communication (step S1207) is performed, the control conditions to be applied may be selected with a consideration of the control conditions specified by another IoT GW 11, as in the third control condition specification processing shown in FIG. 9.

Fourth Control Pattern: Relearning Processing Without Using Shared Information

Figure 13:
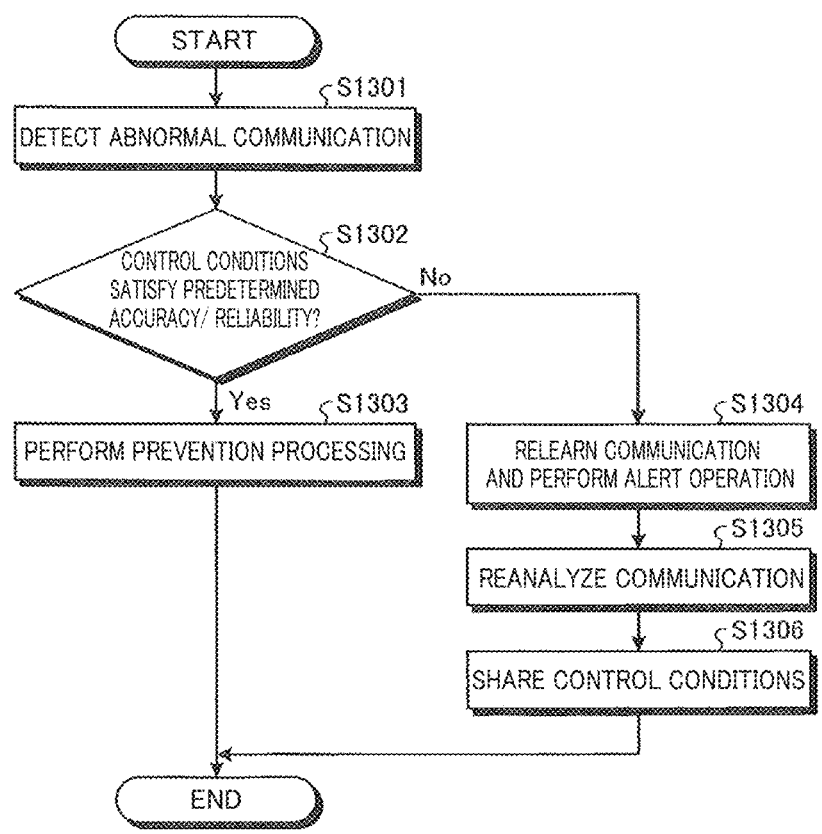
FIG. 13 is a flowchart showing an example of the flow of a fourth control pattern that is performed in the communication control system according to the embodiment.

FIG. 13 is a flowchart showing an example of the flow of a fourth control pattern that is performed in the communication control system 1 according to the embodiment. According to the fourth control pattern, upon abnormal communication occurring, the IoT GW 10 performs relearning, i.e., reanalysis of control conditions, according to the accuracy and reliability of control conditions. According to the fourth control pattern, the IoT GW 10 does not consider the control conditions specified by another IoT GW 11 through relearning.

First, the collection control unit 102 detects abnormal communication performed by an IoT device 40 (step S1301). Thereafter, the collection control unit 102 determines whether or not the control conditions that are being applied at the time satisfy a predetermined accuracy and reliability (step S1302).

Determination of accuracy and reliability is performed in the following manner. When extracting control conditions, the analysis unit 103 performs analysis based on information regarding communication collected by the collection control unit 102 during a predetermined period. However, if the information regarding communication collected during the predetermined period is not sufficient in terms of quality or quantity, the accuracy and reliability of the result of analysis will also be low. According to the present embodiment, it is defined that control information does not satisfy a predetermined accuracy or reliability in the following cases.

(1) A case in which the convergence rate of the conditions to be covered regarding packets subjected to reliability evaluation through curve approximation using the logistic curve and the Gompertz curve is not higher than a predetermined value.

(2) A case in which, when the specified conditions are taken as statistical values, the number of packets and the parameters of elapsed time are statistically insufficient.

If the collection control unit 102 determines that the control conditions satisfy the predetermined accuracy and reliability (step S1302, Yes), the IoT GW 10 directly proceeds to prevention processing (step S1303). For example, the IoT GW 10 performs step S1002 in FIG. 10, steps S1103 to S1107 in FIG. 11, or steps S1203 to S1208 in FIG. 12. On the other hand, if the collection control unit 102 determines that the control conditions do not satisfy the predetermined accuracy and reliability (step S1302, No), the collection control unit 102 instructs the analysis unit 103 to relearn communication. While the analysis unit 103 performs relearning, the collection control unit 102 instructs the user interface unit 105 to emit an alert. In response to an instruction, the analysis unit 103 analyzes information regarding communication collected by the collection control unit 102 to specify control conditions (step S1304, relearning). The user interface unit 105 emits an alert in response to an instruction.

Here, the alert emitted by the user interface unit 105 is not an alert that notifies the user of the occurrence of abnormal communication, but an alert that notifies the user of the fact that relearning is being performed. While the analysis unit 103 is performing relearning, communication performed by the IoT device 40 is regular communication. Therefore, there is the possibility of malicious communication occurring, which is blocked during communication control. Therefore, while the analysis unit 103 is executing relearning, the user interface unit 105 emits an alert to the user to notify the user of the fact that regular communication is being performed. The mode of the alert is not specifically limited as with the alert that notifies the user of the occurrence of abnormal communication. For example, a notification screen may be displayed on the display unit of the IoT GW 10, or a lamp may be lit, or an email may be transmitted to a user terminal. Also, only relearning may be performed without emitting an alert. The processing in steps S1305 and S1306 is the same as the processing in steps S1106 and S1107 in FIG. 11. Thus, processing according to the fourth control pattern is complete.

Fifth Control Pattern: Re-Learning Processing Using Shared Information

Figure 14:
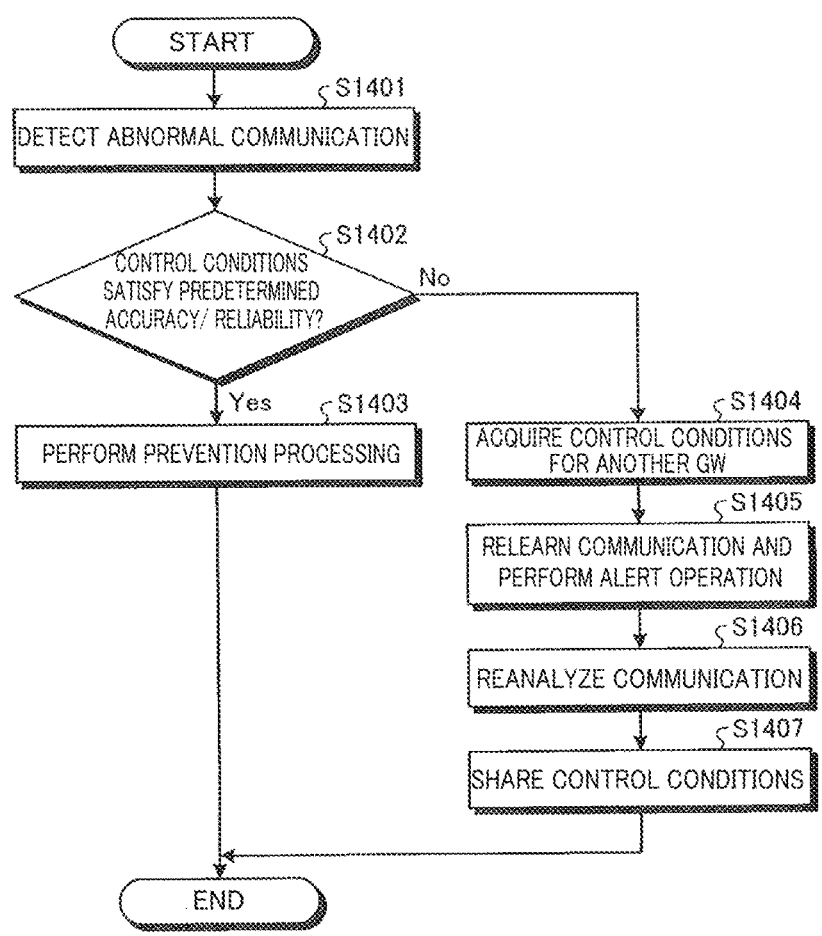
FIG. 14 is a flowchart showing an example of the flow of a fifth control pattern that is performed in the communication control system according to the embodiment.

FIG. 14 is a flowchart showing an example of the flow of a fifth control pattern that is performed in the communication control system 1 according to the embodiment. The fifth control pattern is similar to the fourth control pattern. However, according to the fifth control pattern, relearning is performed with consideration of control conditions specified by another IoT GW 11.

First, the collection control unit 102 detects abnormal communication performed by an IoT device 40 (step S1401). Thereafter, the collection control unit 102 determines whether or not the control conditions that are being applied at the time satisfy a predetermined accuracy and reliability (step S1402). Determination of accuracy and reliability is performed in the same manner as in the fourth control pattern.

If the collection control unit 102 determines that the control conditions satisfy the predetermined accuracy and reliability (step S1402, Yes), the IoT GW 10 directly proceeds to prevention processing (step S1403). For example, the IoT GW 10 performs step S1002 in FIG. 10, steps S1103 to S1107 in FIG. 11, or steps S1203 to S1208 in FIG. 12. On the other hand, if the collection control unit 102 determines that the control conditions do not satisfy the predetermined accuracy and reliability (step S1402, No), the collection control unit 102 instructs the coordination unit 104 to acquire control conditions from another IoT GW 11. The collection control unit 102 also instructs the analysis unit 103 to relearn communication.

The coordination unit 104 acquires control conditions corresponding to the device name from another IoT GW 11 (step S1404). Thereafter, the coordination unit 104 transmits the acquired control conditions to the analysis unit 103. The analysis unit 103 acquires information regarding communication performed during a predetermined period, including communication determined by the collection control unit 102 as abnormal communication, and analyzes (relearns) the information (step S1405). At this time, the analysis unit 103 refers to the control conditions specified by the other IoT GW 11 and received from the coordination unit 104, and extracts control conditions.

For example, control condition extraction methods are set in the IoT GW 10 in advance based on the balance between security and convenience that is expressed as, for example, a low false positive rate. For example, the following three methods may be set.

(1) Extraction Method Focusing on Security

According to this method, the analysis unit 103 extracts control conditions that are commonly set to a plurality of IoT GWs 11. An adjustment is performed so that the contents of communication performed by the IoT device 40 that has brought about the communication to be relearned will be similar to the extracted control conditions. For example, the analysis unit 103 adjusts an analysis target communication collection period during which the collection control unit 102 performs collection. The analysis unit 103 causes the collection control unit 102 to collect communication during the adjusted collection period, and performs reanalysis based on the communication.

(2) Extraction Method Focusing on Balance

According to this method, the analysis unit 103 extracts control condition learning periods that are applied to a plurality of IoT GWs 11. The analysis unit 103 causes the collection control unit 102 to collect communication during the learning period that is most frequently used, and performs reanalysis based on the communication.

(3) Extraction Method Focusing on Convenience

According to this method, the analysis unit 103 adjusts the learning period based on control information learning periods of the IoT GW 11 related to the detected abnormal communication, and performs reanalysis.

While the analysis unit 103 performs reanalysis, the collection control unit 102 instructs the user interface unit 105 to emit an alert. The user interface unit 105 emits an alert according to an instruction (step S1405). The details of an alert are the same as those of the fourth control pattern. The processing in steps S1406 and S1407 is the same as the processing in steps S1305 and S1306 in FIG. 13. Thus, processing according to the fifth control pattern is complete.

Note that the above-described kinds of processing may be combined as necessary. For example, the IoT GW 10 may be configured to reanalyze communication according to a response from the user as in the second control pattern, or allow the user to re-input permission to perform communication, even in the first control pattern. Also, the alert indicating that regular communication is being performed may be constantly displayed during regular communication.

Also, reanalysis according to the fourth control pattern and the fifth control pattern may be automatically performed at predetermined intervals instead of being performed only when abnormal communication occurs, or performed upon the occurrence of an event other than abnormal communication. For example, reanalysis may be performed in response to an instruction input by the user.

Also, regarding control conditions, a condition that an attacker can intentionally reproduce is not used alone as a control condition. For example, a communication frequency and a communication packet size can be intentionally adjusted by an attacker that generates malicious communication. Therefore, when using a communication frequency and a communication packet size as control conditions, the IoT GW 10 is configured to combine the control conditions with other control conditions.

In the above-described embodiment, the IoT GW 10 analyzes communication received by the IoT GW 10 itself, and performs control. The present invention is not limited in this way, and, for example, the IoT GW 10 may acquire communication information from an external apparatus of the IoT GW 10, analyze the communication, and provide control conditions to the external apparatus. For example, the IoT GW 10 may be configured to acquire communication from an external router or gateway, and analyze the information. Thereafter, the IoT GW 10 may transmit control conditions specified based on the result of analysis to the external router or gateway. In this case, the external router or gateway may perform communication control using the security function thereof, such as a firewall function, based on the received control conditions. Also, the functions of the IoT GW 10 according to the above-described embodiment may be additionally implemented on the existing gateways. For example, the functions of the IoT GW 10 may be provided through an update program for an existing IoT GW. Also, for example, the IoT GW 10 may be configured as an external apparatus that can connect to an existing gate way and expand the functions of the existing gateway.

Effects of Embodiment

As described above, the communication control apparatus according to the embodiment includes a collection control unit, an analysis unit, and a coordination unit. The collection control unit collects communication performed with a device connected to a subordinate network, and controls communication performed by the device based on a first control condition. The analysis unit analyzes the communication collected by the collection control unit to extract device identification information indicating characteristics of the communication performed by the device. The analysis unit specifies a device name of the device and the first control condition corresponding to a normal communication range extracted from the device identification information, based on the device identification information. The coordination unit transmits at least part of first shared information in which the device name and the first control condition specified by the analysis unit and the device identification information are associated with each other, to an outside of the subordinate network. Therefore, the communication control apparatus according to the embodiment can realize control that matches the communication state of each IoT device without relying on external information.

Also, in the communication control apparatus according to the embodiment, the coordination unit receives at least part of second shared information in which a device name of a subordinate device of another communication control apparatus and a second control condition, specified on the other communication control apparatus, and device identification information, are associated with each other. The analysis unit specifies a device name with reference to the second shared information, using the device identification information as a key. Therefore, even when only a small amount of information is accumulated in the communication control apparatus, the communication control apparatus can efficiently specify the device name using information specified on another communication control apparatus.

Also, in the communication control apparatus according to the embodiment, the analysis unit sets a communication collection period that is used to specify the first control condition, with reference to a communication collection period used by the other communication control apparatus in order to specify the second control condition. Therefore, the communication control apparatus can swiftly perform relearning with reference to processing performed in the other communication control apparatus.

Also, in the communication control apparatus according to the embodiment, the analysis unit extracts at least one of: an open port; a communication destination; traffic; a communication protocol; a communication frequency; a communication packet size; and payload characteristics, of the device, as the device identification information. Therefore, the communication control apparatus can specify control conditions based on the characteristics of communication performed by each device. Therefore, the communication control apparatus can realize fine control that matches the characteristics of communication performed by each device.

The communication control apparatus according to the embodiment further includes a user interface unit that transmits the device name of the device specified by the analysis unit to a user as a candidate device name, and receives a device name specified by the user. The analysis unit specifies the device name specified by the user, as the device name of the device. Therefore, it is possible to specify the device name of a new device based on a user input upon connection of the device being detected. In this way, the communication control apparatus according to the embodiment specifies the device name of a device whose device name is unknown, at the first connection, using the user as an information source, and thereafter shares the device name with another communication control apparatus. Therefore, the communication control apparatus can swiftly specify the device name.

Also, the communication control apparatus according to the embodiment shares the device name specified by the communication control apparatus with another communication control apparatus in real time. Thus, it is possible to even more swiftly specify the device name. Also, the communication control apparatus according to the embodiment can extract control conditions for detecting a device name and abnormal communication based on information that is shared with another communication control apparatus, and can thus help the user in making a determination.

Also, the communication control system according to the embodiment, upon a new IoT device being connected as a subordinate device of an IoT GW, specifies a device name when permitting connection and communication performed by the IoT device. Also, the communication control system according to the embodiment specifies the device name based on a user input. The communication control system according to the embodiment shares the specified device name among IoT GWs, in association with an IoT device class. In this way, the communication control system according to the embodiment realizes communication analysis at a position near an IoT device and sharing of the result of analysis among IoT GWs. Therefore, it is possible to perform control that is more suitable for each IoT device, and visualization of information. Also, it is possible to acquires a device name and control conditions and improve detection accuracy among IoT GWs without relying on external information.

Also, the communication control system according to the embodiment analyzes communication in an IoT GW. An IoT GW is usually under the control of the user, and communication information does not leak to others. Therefore, the communication control system according to the embodiment can ensure security of analysis. Also, communication under the control of the IoT GW is subjected to analysis, and therefore it is possible to reduce the amount of information of the IoT GW that is subjected to analysis. Therefore, it is possible to realize an IoT GW at low cost. Also, analysis is performed in each IoT GW, and therefore analysis points can be dispersed. Therefore, it is possible to realize communication analysis regarding an IoT service without using a large-sized external system. Therefore, it is possible to reduce costs in terms of the entire system.

The communication control system according to the embodiment analyzes communication performed by an IOT device, using the IoT device as an information source, to extract control conditions, and uses the control conditions as a whitelist. Therefore, the communication control system according to the embodiment can perform appropriate control specifically for each IoT device. The communication control system according to the embodiment performs control using the control conditions as a whitelist, and therefore the communication control system can detect an access that is performed through a new attacking method upon the attack occurring. Therefore, the communication control system can promptly address a new attacking method as well.

System Configurations, Etc.

The constituent elements of the apparatus in the drawings show functional concepts and need not be necessarily formed as shown in the drawings in terms of the physical configurations thereof. That is to say, a specific mode in which the apparatuses are dispersed or integrated is not limited to the mode shown in the drawings, and all or one or more of the apparatuses may be functionally or physically dispersed or integrated in any units according to various kinds of loads, usage conditions, and so on. Furthermore, all or given one or more of the processing functions performed by the apparatuses may be realized by a CPU (Central Processing Unit) and a program that is analyzed and executed by the CPU, or may be realized as hardware using wired logic.

Also, among the various kinds of processing described in the present embodiment, all or part of processing that is described as processing that is automatically performed may be manually performed, and all or part of processing that is described as processing that is manually performed may be automatically performed using a well-known method. In addition, the processing procedures, control procedures, specific names, various kinds of data, and information including parameters described in the above description or the drawings may be freely changed unless otherwise specified.

Program

In one embodiment, the IoT GW 10 may be implemented by installing a communication control program that performs the above-described monitoring as packaged software or online software into a desired computer. For example, it is possible to enable an information processing apparatus to function as the IoT GW 10 by causing the information processing apparatus to perform the above-described communication control program. The information processing apparatus mentioned here may be a desktop or laptop personal computer. In addition, examples of the information processing apparatus include a mobile communication terminal such as a smartphone, a mobile phone, and a PHS (Personal Handyphone System), and a slate terminal such as a PDA (Personal Digital Assistant).

Figure 15:
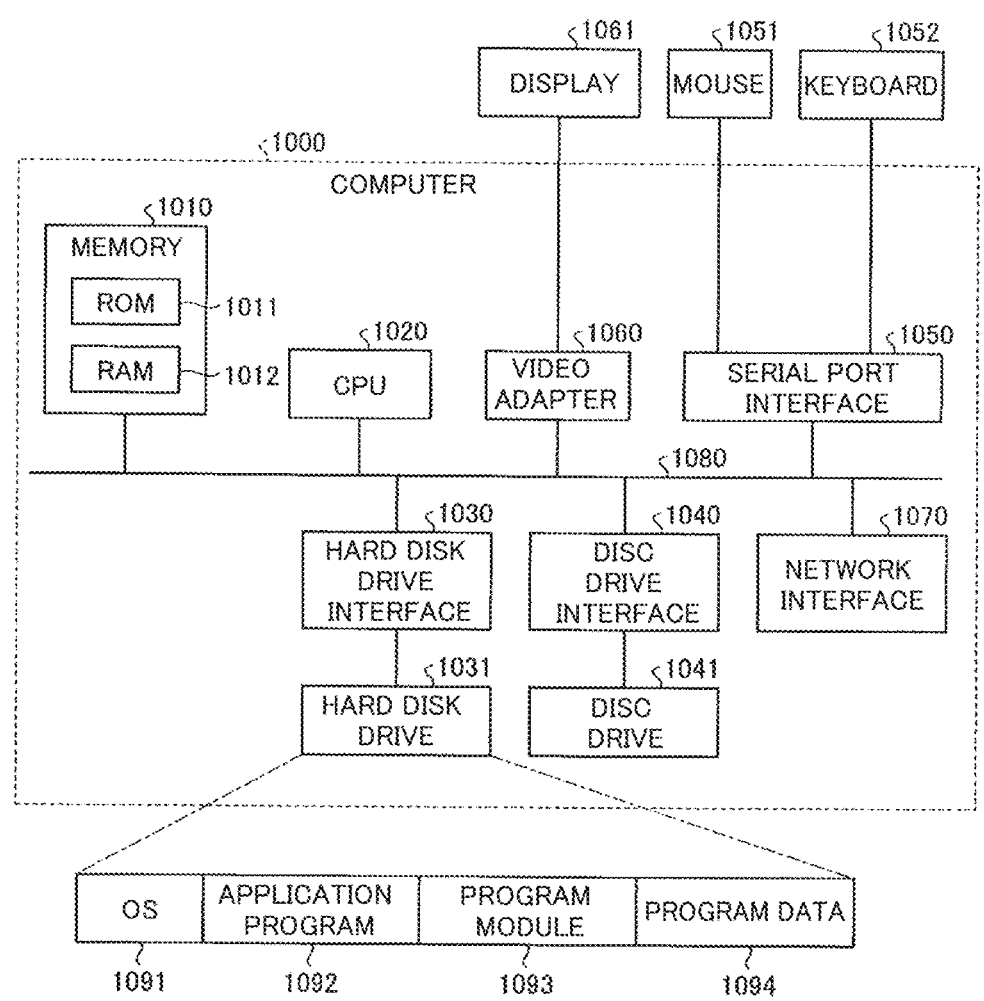
FIG. 15 is a diagram showing an example of a computer that executes a program to realize a communication control apparatus according to the embodiment.

FIG. 15 is a diagram showing an example of a computer that executes a program to realize the IoT GW 10 (a communication control apparatus). A computer 1000 includes a memory 1010 and a CPU 1020, for example. The computer 1000 also includes a hard disk drive interface 1030, a disc drive interface 1040, a serial port interface 1050, a video adapter 1060, and a network interface 1070. These units are connected via a bus 1080.

The memory 1010 includes a ROM (Read Only Memory) 1011 and a RAM (Random Access Memory) 1012. The ROM 1011 stores a boot program such as a BIOS (Basic Input Output System) program, for example. The hard disk drive interface 1030 is connected to a hard disk drive 1031. The disc drive interface 1040 is connected to a disc drive 1041. For example, a removable storage medium such as a magnetic disc or an optical disc is inserted into the disc drive 1041. The serial port interface 1050 is connected to a mouse 1051 and a keyboard 1052, for example. The video adapter 1060 is connected to a display 1061, for example.

The hard disk drive 1031 stores an OS 1091, an application program 1092, a program module 1093, and program data 1094, for example. That is to say, the program that defines each kind of processing performed by the IoT GW 10 is implemented as the program module 1093 in which codes that are executable by the computer 1000 are written. The program module 1093 is stored on the hard disk drive 1031, for example. For example, the program module 1093 for executing the same processing as the processing performed by the functional elements of the IoT GW 10 is stored on the hard disk drive 1031. Note that the hard disk drive 1031 may be replaced with an SSD (Solid State Drive).

Also, Data that is used in processing according to the above-described embodiment is stored on the memory 1010 or the hard disk drive 1031, for example, as the program data 1094. The CPU 1020 reads out the program module 1093 or the program data 1094 stored on the memory 1010 or the hard disk drive 1031 to the RAM 1012, and executes such a program as necessary.

Note that the program module 1093 and the program data 1094 are not limited to being stored on the hard disk drive 1031, and may be stored on a removable medium, for example, and read out by the CPU 1020 via the disc drive 1041 or the like. Alternatively, the program module 1093 and the program data 1094 may be stored in another computer connected via a network (a LAN (Local Area Network), a WAN (Wide Area Network), or the like). The program module 1093 and the program data 1094 may be read out by the CPU 1020 from the other computer via the network interface 1070.

The above-described embodiment and modifications thereof are included in the scope of the invention disclosed in the claims and the scope of equivalents thereof, as well as being included in the technology disclosed in the present application.

REFERENCE SIGNS LIST

1 Communication control system
10 IoT gateway
11, 11A, 11B Another IoT gateway
100 Controller
101 Communication unit
102 Collection control unit
103 Analysis unit
104 Coordination unit
105 User interface (UI) unit
20 Server
30 General-purpose communication device
40, 40A, 40B IoT device
NW-A External network
NW-B Network

The invention claimed is:

1. A communication control apparatus comprising:
a memory; and
processing circuitry coupled to the memory and configured to:
collect communication performed with a device connected to a subordinate network, and control communication performed by the device based on a first control condition;
analyze the communication collected by the collecting to extract device identification information indicating characteristics of the communication performed by the device, and specify a device name of the device and the first control condition corresponding to a normal communication range extracted from the device identification information, based on the device identification information; and
transmit at least part of first shared information in which the device name and the first control condition specified by the analyzing and the device identification information are associated with each other, to an outside of the subordinate network,
wherein the transmitting receives at least part of second shared information in which a device name of a subordinate device of another communication control apparatus and a second control condition, specified on the other communication control apparatus, and the device identification information, are associated with each other, and
wherein the analyzing specifies a device name of the device with reference to the second shared information, using the device identification information as a key.

2. The communication control apparatus according to claim 1, wherein the analyzing sets a communication collection period that is used to specify the first control condition, with reference to a communication collection period used by the other communication control apparatus in order to specify the second control condition.

3. The communication control apparatus according to claim 1, wherein the analyzing extracts at least one of: an open port; a communication destination; traffic; a communication protocol; a communication frequency; a communication packet size; and payload characteristics, of the device, which is the device identification information.

4. The communication control apparatus according to claim 1, the processing circuitry is further configured to transmit the device name of the device specified by the analyzing to a user as a candidate device name, and receive a device name specified by the user,
wherein the analyzing specifies the device name specified by the user, as the device name of the device.

5. A communication control method that is performed by a communication control apparatus, comprising:
collecting communication performed with a device connected to a subordinate network, and controlling communication performed by the device based on a first control condition;
analyzing the communication collected in the collection control step to extract device identification information indicating characteristics of the communication performed by the device, and specifying a device name of the device and the first control condition corresponding to a normal communication range extracted from the device identification information, based on the device identification information;
transmitting at least part of first shared information in which the device name and the first control condition specified in the analyzing and the device identification information are associated with each other, to an outside of the subordinate network,
wherein the transmitting receives at least part of second shared information in which a device name of a subordinate device of another communication control apparatus and a second control condition, specified on the other communication control apparatus, and the device identification information, are associated with each other, and
wherein the analyzing specifies a device name of the device with reference to the second shared information, using the device identification information as a key.

6. A non-transitory computer-readable recording medium storing therein a communication control program for causing a computer to carry out a process comprising:
collecting communication performed with a device connected to a subordinate network, and controlling communication performed by the device based on a first control condition;
analyzing the communication collected in the collection control step to extract device identification information indicating characteristics of the communication performed by the device, and specifying a device name of the device and the first control condition corresponding to a normal communication range extracted from the device identification information, based on the device identification information; and
transmitting at least part of first shared information in which the device name and the first control condition specified in the analyzing and the device identification information are associated with each other, to an outside of the subordinate network,
wherein the transmitting receives at least part of second shared information in which a device name of a subordinate device of another communication control apparatus and a second control condition, specified on the other communication control apparatus, and the device identification information, are associated with each other, and
wherein the analyzing specifies a device name of the device with reference to the second shared information, using the device identification information as a key.

7. The method according to claim 5, wherein the analyzing sets a communication collection period that is used to specify the first control condition, with reference to a communication collection period used by the other communication control apparatus in order to specify the second control condition.

8. The communication control apparatus according to claim 5, wherein the analyzing extracts at least one of: an open port; a communication destination; traffic; a communication protocol; a communication frequency; a communication packet size; and payload characteristics, of the device, which is the device identification information.

9. The method according to claim 5, further comprising:
transmitting the device name of the device specified by the analyzing to a user as a candidate device name, and receive a device name specified by the user,
wherein the analyzing specifies the device name specified by the user, as the device name of the device.

10. The non-transitory computer-readable recording medium according to claim 6, wherein the analyzing sets a communication collection period that is used to specify the first control condition, with reference to a communication collection period used by the other communication control apparatus in order to specify the second control condition.

11. The non-transitory computer-readable recording medium according to claim 6, wherein the analyzing extracts at least one of: an open port; a communication destination; traffic; a communication protocol; a communication frequency; a communication packet size; and payload characteristics, of the device, which is the device identification information.

12. The non-transitory computer-readable recording medium according to claim 6, wherein:
the communication control program further causes the computer to carry out transmitting the device name of the device specified by the analyzing to a user as a candidate device name, and receiving a device name specified by the user, and
the analyzing specifies the device name specified by the user, as the device name of the device.

\* \* \* \* \*